(12) United States Patent
Cheng et al.

(10) Patent No.: US 9,961,036 B2
(45) Date of Patent: *May 1, 2018

(54) NEWS FEED TECHNIQUES

(71) Applicant: Microsoft Corporation, Redmond, WA (US)

(72) Inventors: David J. Cheng, Cupertino, CA (US); Ken H. Chin, Redwood City, CA (US); Oludare V. Obasanjo, Renton, WA (US); Douglas R. Pearce, Seattle, WA (US); Seung-Hae Park, Seattle, WA (US); Jennie P. Telehowski, Aliviso, CA (US); Mohammed Arshad Hussain, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/579,439

(22) Filed: Dec. 22, 2014

(65) Prior Publication Data

US 2015/0113438 A1  Apr. 23, 2015

Related U.S. Application Data

(63) Continuation of application No. 12/769,443, filed on Apr. 28, 2010, now Pat. No. 8,935,339.

(51) Int. Cl.
*G06F 3/00* (2006.01)
*H04L 12/58* (2006.01)
(Continued)

(52) U.S. Cl.
CPC .......... *H04L 51/32* (2013.01); *G06F 3/04817* (2013.01); *G06Q 10/10* (2013.01);
(Continued)

(58) Field of Classification Search
CPC ....... H04L 51/32; H04L 51/046; H04L 51/08; H04L 12/589; H04L 51/24; H04L 12/587;
(Continued)

(56) References Cited

U.S. PATENT DOCUMENTS 7,035,848 B2  4/2006  Shapiro et al.
7,669,123 B2  2/2010  Zuckerberg et al.
(Continued)

FOREIGN PATENT DOCUMENTS

CN  1581192 A  2/2005
CN  1790399 A  6/2006
(Continued)

OTHER PUBLICATIONS

"Third Office Action and Search Report Issued in Chinese Application No. 201110118766.6", dated Jun. 23, 2016, 13 Pages.
(Continued)

*Primary Examiner* — John B Walsh (57) ABSTRACT

News feed techniques are described. In implementations, content is parsed from one or more emails that are addressed to a user. The parsed content from the email is exposed, automatically and without user intervention, for output in a news feed of the user.

20 Claims, 5 Drawing Sheets

(51) Int. Cl.
  *H04W 4/12* (2009.01)
  *H04W 4/20* (2018.01)
  *G06Q 10/10* (2012.01)
  *G06Q 50/00* (2012.01)
  *G06F 3/0481* (2013.01)

(52) U.S. Cl.
  CPC ............ *G06Q 50/01* (2013.01); *H04L 51/046* (2013.01); *H04L 51/08* (2013.01); *H04L 51/24* (2013.01); *H04L 51/36* (2013.01); *H04W 4/12* (2013.01); *H04W 4/20* (2013.01); *H04W 4/206* (2013.01)

(58) Field of Classification Search
  CPC ... H04L 51/36; H04L 12/588; G06F 3/04817; G06Q 50/01; G06Q 10/10; H04W 4/206; H04W 4/20; H04W 4/12
  See application file for complete search history.

(56) References Cited

U.S. PATENT DOCUMENTS

| | | | |
|---|---|---|---|
| 8,935,339 | B2 | 1/2015 | Cheng et al. |
| 9,047,587 | B2* | 6/2015 | Slakman ............... G06Q 10/10 |
| 2003/0212745 | A1 | 11/2003 | Caughey |
| 2005/0289468 | A1 | 12/2005 | Kahn et al. |
| 2006/0010217 | A1 | 1/2006 | Sood |
| 2007/0016609 | A1 | 1/2007 | Kim et al. |
| 2007/0162432 | A1* | 7/2007 | Armstrong ........ G06F 17/30867 |
| 2007/0168367 | A1 | 7/2007 | Dickinson et al. |
| 2008/0040474 | A1 | 2/2008 | Zuckerberg et al. |
| 2008/0126476 | A1 | 5/2008 | Nicholas |
| 2008/0140720 | A1* | 6/2008 | Six .................... G06F 17/30053 |
| 2008/0176655 | A1 | 7/2008 | James et al. |
| 2009/0006285 | A1 | 1/2009 | Meek et al. |
| 2009/0164457 | A1 | 6/2009 | Aarnes et al. |
| 2009/0209286 | A1 | 8/2009 | Bentley et al. |
| 2010/0082745 | A1 | 4/2010 | Davis et al. |
| 2010/0179916 | A1 | 7/2010 | Johns et al. |
| 2010/0179961 | A1* | 7/2010 | Berry ................ G06F 17/30908 707/769 |
| 2011/0010305 | A1 | 1/2011 | Aleong et al. |
| 2011/0270931 | A1 | 11/2011 | Cheng et al. |
| 2011/0289574 | A1 | 11/2011 | Hull et al. |
| 2012/0066340 | A1 | 3/2012 | Armstrong et al. |
| 2012/0066618 | A1 | 3/2012 | Barker et al. |
| 2012/0173642 | A1 | 7/2012 | Rosenberger |
| 2012/0324003 | A1 | 12/2012 | Armstrong et al. |
| 2013/0290431 | A1 | 10/2013 | Armstrong et al. |

FOREIGN PATENT DOCUMENTS

| | | |
|---|---|---|
| CN | 101124537 | 2/2008 |
| CN | 101212298 | 7/2008 |
| CN | 101410825 | 4/2009 |

OTHER PUBLICATIONS

"Second Office Action Issued in Chinese Patent Application No. 201110118766.6", dated Jan. 5, 2016, 11 Pages.
"Foreign Office Action", CN Application No. 201110118766.6, Feb. 17, 2015, 14 pages.
"Non-Final Office Action", U.S. Appl. No. 12/769,443, dated Mar. 28, 2014, 10 pages.
"Extended European Search Report", EP Application No. 10850908.4, Nov. 11, 2014, 10 pages.
"Friend Feed Help Center", Available at: http://friendfeed.com/about/help, Apr. 14, 2010, 12 pages.
"XFBML", Retrieved from: <http://wiki.developers.facebook.com/index.php/XFBML> on Mar. 1, 2010, Jan. 30, 2010, 3 pages.
"Notice of Allowance", U.S. Appl. No. 12/769,443, dated Sep. 5, 2014, 4 pages.
"Facebook Granted News Feed Patent", Retrieved from: <http://swik.net/posts+Facebook> on Mar. 1, 2010, Feb. 25, 2010, 40 pages.
"Non-Final Office Action", U.S. Appl. No. 12/769,443, dated Jun. 18, 2012, 6 pages.
"Non-Final Office Action", U.S. Appl. No. 12/769,443, dated Jan. 18, 2013, 8 pages.
"Final Office Action", U.S. Appl. No. 12/769,443, dated Sep. 20, 2012, 8 pages.
"International Search Report and Written Opinion", Application No. PCT/US2010/045872, dated May 4, 2011, 9 pages.
"Final Office Action", U.S. Appl. No. 12/769,443, dated Jul. 16, 2013, 9 pages.
Buzink,"Mailfeed—Mail2feed Php Script", Available at: http://robertbuzink.com/2006/mailfeed-mail2feed-php-script/, Jul. 25, 2006, 6 pages.
Gotta,"Turning E-mail into a Social Network", Retrieved from: <http://mikeg.typepad.com/perceptions/2007/11/turning-e-mail-.html> on Mar. 1, 2010, Nov. 15, 2007, 2 pages.
Hunt,"Yahoo Mail becomes more Social, but you'll have to Pay a Price", Retrieved from: <http://www.tgdaily.com/software-features/40605-yahoo-mail-becomes-more-social-but-youll-have-to-pay-a-price> on Mar. 1, 2010, Dec. 16, 2008, 3 pages.
Kaly,"RSSMix: Merging Multiple RSS Feeds Into One Online", Available at: http://www.makeuseof.com/tag/rssmix-merging-multiple-rss-feeds/, Nov. 15, 2009, 2 pages.
McCough,"ii.com . Procmail Quick Start: An introduction to Email filtering with a focus on Procmail", Available at: http://www.ii.com/internet/robots/procmail/qs/, Nov. 27, 2007, 60 pages.
"Fourth Office Action and Search Report Issued in Chinese Patent Application No. 201110118766.6", dated Dec. 20, 2016, 14 Pages.
"Fifth Office Action and Search Report Issued in Chinese Patent Application No. 201110118766.6", dated Mar. 24, 2017, 15 Pages.
"Sixth Office Action Issued in Chinese Patent Application No. 201110118766.6", dated Jul. 18, 2017, 10 Pages.
"Office Action Issued in Chinese Patent Application No. 201110118766.6", Dated Nov. 17, 2017, 10 Pages.

* cited by examiner

NEWS FEED TECHNIQUES

RELATED APPLICATIONS

This application is a continuation of and claims priority to U.S. application Ser. No. 12/769,443 filed Apr. 28, 2010, the entire disclosure of which is hereby incorporated by reference.

BACKGROUND

Users have access to a wide variety to techniques that may be used to communicate over a network. For example, a user may send emails, communicate via instant messages, post "notes" (e.g., to a wall of a social network), communicate status messages, post to a blog, and so on.

Traditional techniques that were used to perform this communication, however, were provided using different mechanisms. Therefore, a user of these traditional techniques may be forced to interact with a variety of different applications, websites, and so on to receive communications using these different mechanisms, which could lead to user frustration.

SUMMARY

News feed techniques are described. In implementations, content is parsed from one or more emails that are addressed to a user. The parsed content from the email is exposed, automatically and without user intervention, for output in a news feed of the user.

In implementations, a news feed is received at a client device via a network connection. The news feed is output for display in a user interface by the client device, the news feed configured to include a concurrent display of content parsed from one or more emails and social network content from a social network service.

In implementations, content is parsed from one or more communications that are addressed to a user. A verification is formed that is configured to verify that the parsed content is permitted for inclusion in a news feed that involves the user, the news feed configured to include social network content from a social network service. A communication is formed to communicate the formed verification over a network to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Social activities, such as comments on photos, being tagging in a photo, receiving a private message, posting status updates, and so on are increasing in popularity amount users of social network services. Although email may describe social activities, this presentation is relegated to display in a separate user interface. Therefore, users of traditional techniques may be forced to navigate between different user interfaces, applications, websites, and so on to interact using these different techniques.

News feed techniques are described. In implementations, communications such as email are leveraged to add additional content to a user's news feed. For example, photos, potential calendar dates of interest, and so on may be parsed from emails addressed to a user for display in a news feed of the user. In an implementation, this content is provided for display in a private feed of the user that is not accessible to other users. In another implementation, this parsed content is provided for display in a public feed (e.g., to one or more friends of the user). For example, the news feed techniques may employ a verification mechanism to verify whether inclusion of the parsed content is permitted for inclusion in the news feed. In this way, the content may be automatically parsed from the emails and the user may then choose which of the content is to be included in the news feed for viewing by other users, such as "friends" of the user. A variety of other techniques are also contemplated, further discussion of which may be found in relation to the following sections.

In the following discussion, an example environment is first described that is operable to perform news feed techniques. Example procedures are then described which may be employed by the example environment. However, it should be readily apparent that the example environment is not limited to performing the example techniques and the example techniques are not limited to performance in the example environment.

Example Environment

Figure 1:
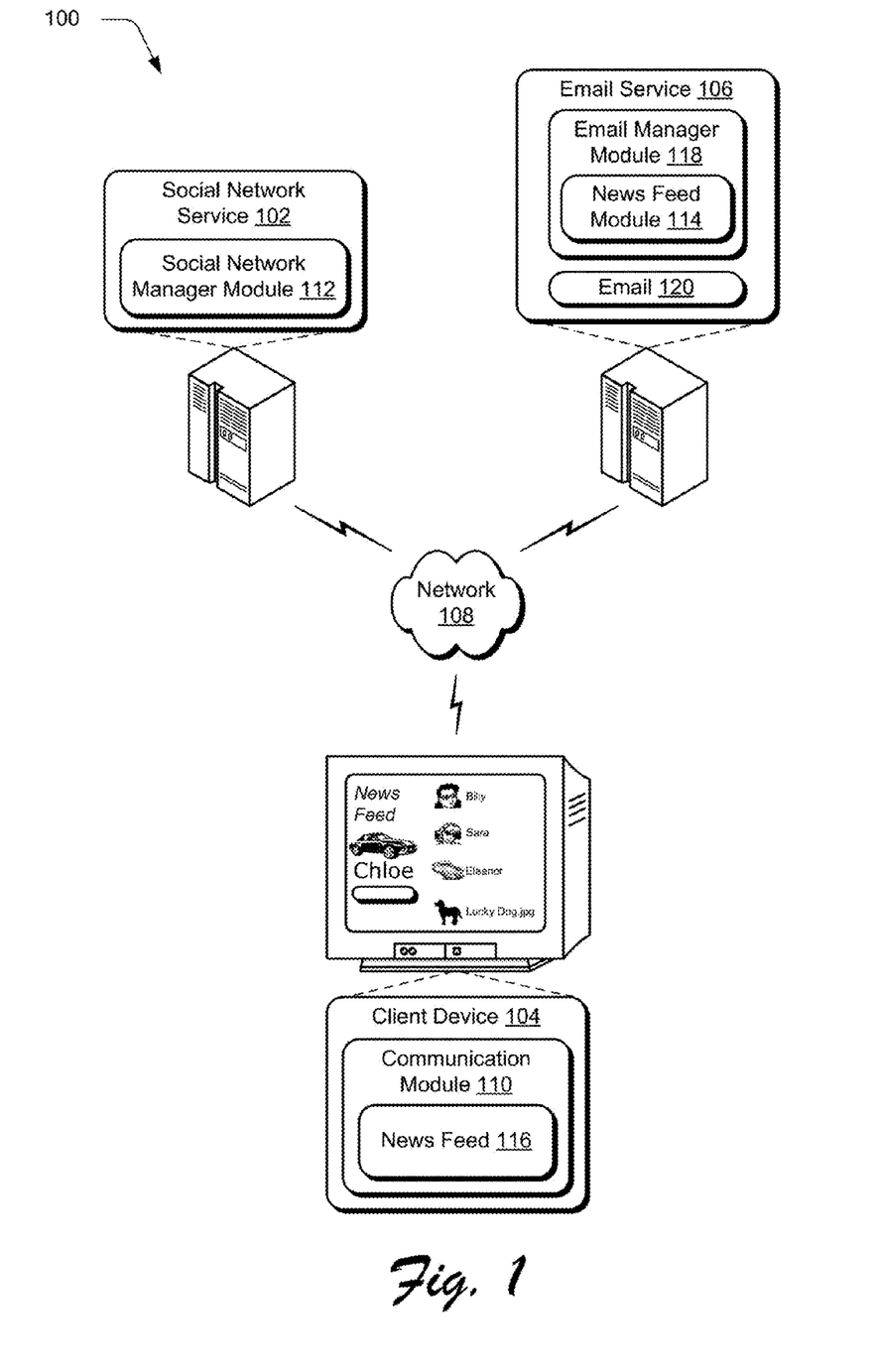
FIG. 1 is an illustration of an environment in an example implementation that is operable to perform news feed techniques.

FIG. 1 is an illustration of an environment 100 in an example implementation that is operable to employ news feed techniques. The illustrated environment 100 includes a social network service 102, a client device 104, and an email service 106, each of which are communicatively coupled, one to another, over a network 108.

The client device 104 may be configured in a variety of ways. For example, the client device 104 may be configured as a computer that is capable of communicating over the network 108, such as a desktop computer, a mobile station, an entertainment appliance, a set-top box communicatively coupled to a display device, a wireless phone, a game console, and so forth. Thus, the client device 104 may range from full resource devices with substantial memory and processor resources (e.g., personal computers, game consoles) to a low-resource device with limited memory and/or processing resources (e.g., traditional set-top boxes, handheld game consoles). The client device 104 may also relate to an entity that operates the client device 104. In other words, the client device 104 may describe logical clients that include software in the following discussion. Likewise, the social network service 102 and the email service 106 may be implemented using a variety of different computing devices, examples of which are illustrated as one or more servers.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. For instance, the social network service 102 and the client device 104 may be communicatively coupled via the Internet. Additionally, the social network service 102 and the email service 106 may be communicatively coupled via a corporate intranet. A wide variety of other instances are also contemplated.

The client device 104 is illustrated as including a communication module 110. The communication module 110 is representative of functionality of the client device 104 to communicate via the network 108. For example, the communication module 110 may include browser functionality to interact with the social network service 102 and the email service 106 via the network 108.

The social network service 102 may support a variety of different functionality which is represented by the social network manager module 112. Through the social network manager module 112, for instance, the social network service 102 may support communication of status updates between the client device 104 and another client device that have been specified as friends of each other. Additionally, the specified "friendship" of the social network service 102 may be used as a basis to permit sharing of photos, video, blogs, and so on. Thus, the social network service 102 may use the friend relationship as a permissioning technique to permit or restrict access to content associated with a user's account of the social network service 102.

For instance, the client device 104 may be associated with a user's account of the social network service 102. Through this user account, the client device 104 may be used to specify a friend, such as a user account of the social network service 102 that is accessible via another client device. By doing this, the other client device is permitted to access content associated with the client device 104, such as content associated with an account of the social network service 102 of a user of the client device 104 that provided credentials to access the user account. Although a permissioning technique regarding friends have been described, it should be readily apparent that the social network service 102 may be configured in a variety of ways to support communication between users, such as by communicating status updates to subscribers of a particular user's network feed, exposing content for access by the general public, and so on.

The email service 106 is illustrated as included an email manager module 118 that is representative of functionality regarding email 120, e.g., composing, sending, receiving, and so forth. For example, the email service 106 may be implemented at a business that hosts its own email 120. In another example, the email service 106 may be part of a web service that is accessible via browser functionality, an example of which is shown in relation to FIG. 2.

Additionally, the email service 106, and more particularly the email manager module 118, is also illustrated as including a news feed module 114 that is representative of functionality regarding news feeds. In an implementation, the news feed module 114 may be representative of functionality to generate a news feed 116 for output by a client device 104 that includes content parsed from communications. For example, the email content may be directly sent to a news feed 116 at an email service to be complimentary to the existing news feeds that are obtained directly from third party services.

Content from the email 120 may then be parsed from the email 120 for inclusion in a news feed 116 that is generated by the news feed module 114. In this way, the news feed module 114 may leverage email 120 that is to be sent to a particular user to populate the news feed 116, further discussion of which may be found in relation to the following figures. Although functionality of the news feed module 114 is discussed in relation to the email service 102, this functionality may be implemented by a variety of different entities, such as by the social network service 102, the client device 104 itself, by a stand-alone entity (i.e., an entity other than the social network service 102 or the email service 106), and so on.

Generally, any of the functions described herein can be implemented using software, firmware, hardware (e.g., fixed logic circuitry), manual processing, or a combination of these implementations. The terms "module" and "functionality" as used herein generally represent software, firmware, hardware, or a combination thereof. In the case of a software implementation, the module or functionality represents program code that performs specified tasks when executed on a processing system having one or more processors (e.g., CPU or CPUs). The program code can be stored in one or more computer readable memory devices, e.g., memory or other storage media. The features of the news feed techniques described below are platform-independent, meaning that the techniques may be implemented on a variety of commercial computing platforms having a variety of processors.

Figure 2:
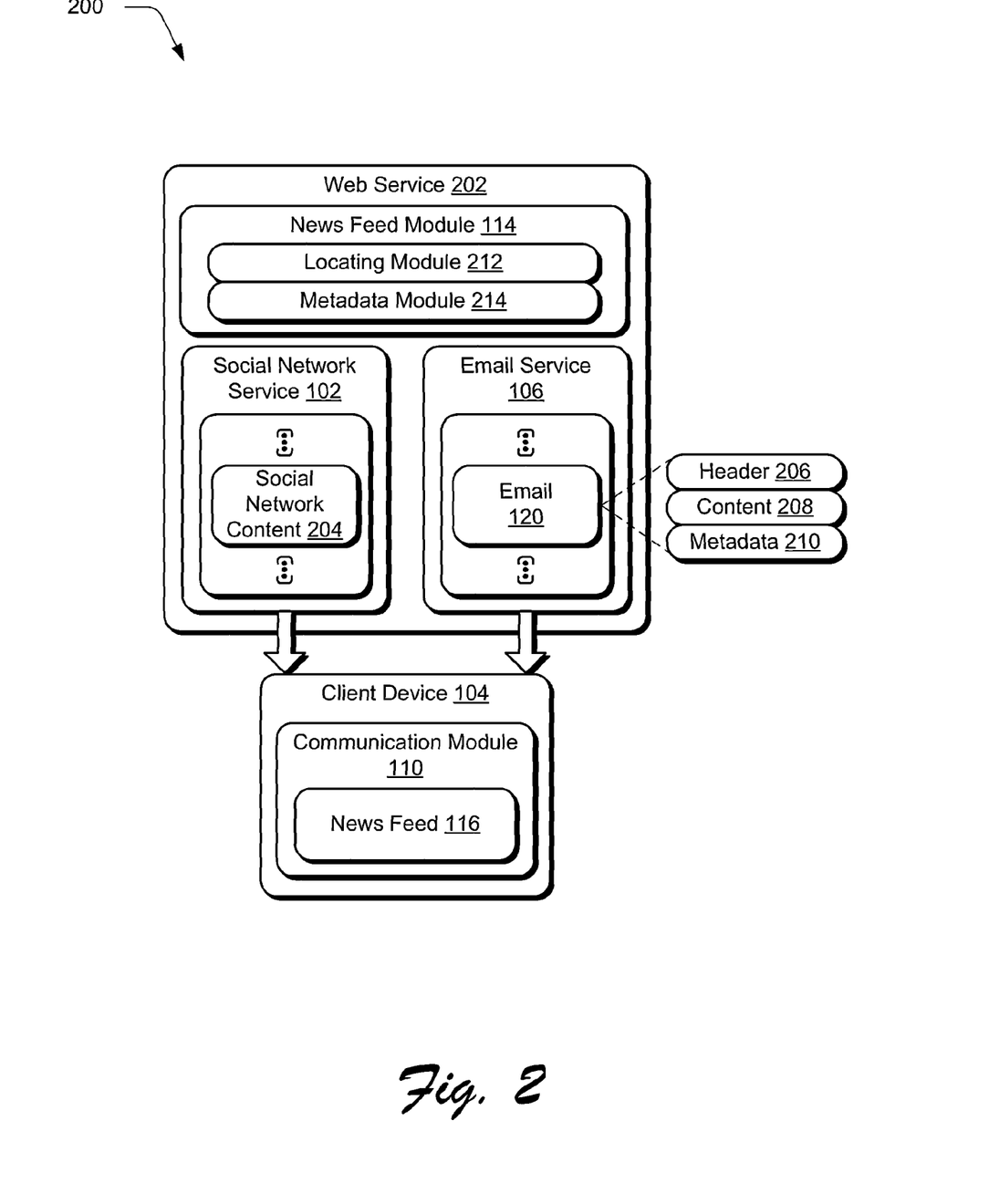
FIG. 2 is an illustration of an example system that shows a web service as implementing the news feed techniques.

FIG. 2 depicts a system 200 in an example implementation showing the social network service 102 and the email service 106 as implemented as part of a web service 202. Although the social network service 102 and the email service 106 are shown as being implemented by a single web service 202, as previously stated these entities may be implemented using different services having different domains, employ different hardware and software resources, and so on. The web service 202 is accessible to the client device 104 via a network, e.g., the network 108 of FIG. 1 via browser functionality.

The news feed module 114 is configured in this example to provide social network content for inclusion in the news feed 116 that is exposed for output by the client device 104. For example, the social network content 204 may be configured to include status updates (which may include posts from a micro-blogging service), notes (e.g., "writings on a wall"), messages, media (e.g., photos and video), links, and so on.

The news feed module 114 may also be configured to provide content from the email 120. For purposes of the following discussion, the email 120 may be representative of one or more emails. Accordingly, the email 120 may be referred to in singular (e.g., the email 120) and plural (e.g., the emails 110) forms.

The email 120 includes a header 206 and content 208. The header 206 includes information that is usable to deliver the email 120, such as an email address of an intended recipient.

e.g., the client device 104. The header 206 may also include other information such as an email address of an originator of the email 120, a subject header, and so on.

The content 208 may be representative of a variety of different types of content that may be included in the email 120. For example, the content 208 may include textual content that may be configured in a variety of different ways, such as text of a letter, status updates, sharing information, contact information, and so on. A variety of other textual information is also contemplated, such as billing information, purchase confirmation information, banking information, scheduling information, and so on. The content 208 may also include a variety of non-textual content, such as images, music files, video files, links to other content over the network 108, and so on.

The news feed module 114 may employ a variety of techniques to parse content 208 from the email 120. For example, the news feed module 114 may employ a locating module 212 that is representative of functionality to locate unstructured content 208 from the email 120. For example, the locating module 212 may include logic to locate content 208 that pertains to one or more social activities, such as media, pertains to a date, describes an activity, and so on. Thus, in this example the email 120 is not structured to aid in locating and identifying the types of content 208 included in the email.

In another example, the email 120 may include functionality that identifies the content 208 in the email 120. As illustrated in FIG. 2, for instance, the email 120 is further illustrated as including metadata 210 that describes the content 208 of the email 120. Thus, the metadata 210 may be used to identify the content (e.g., a status update) instead of just formatting that is to be applied to the content (e.g., to bold text).

The metadata 116 may follow a schema that may describe both textual and non-textual content 208 of the email 120. This description may then be leveraged to identify the content 208, e.g., to locate the content 208 that describes social activities. The metadata 210 may be generated using a variety of techniques, such as by an originator of the email 120, by an intermediary (e.g., the email service 106), and so on.

Accordingly, the news feed module 114 may leverage a metadata module 214 that is configured to identify the content 208 using the metadata 210. For example, the metadata 210 may include tags that identify content 208 that pertains to (e.g., originated from) a social network service, such as to identify a post to a wall. The tags 210 may also describe a variety of other activities, such as a location (e.g., for use in a geo-locating service). This content 208 identified by the metadata module 214 using the metadata 210 may then be exposed for inclusion in the news feed 116 of the client device 104. In this way, the news feed 116 may be configured to include social network content 204 as well as content 208 parsed from emails 120, an example of which is described in relation to the following figure.

Figure 3:
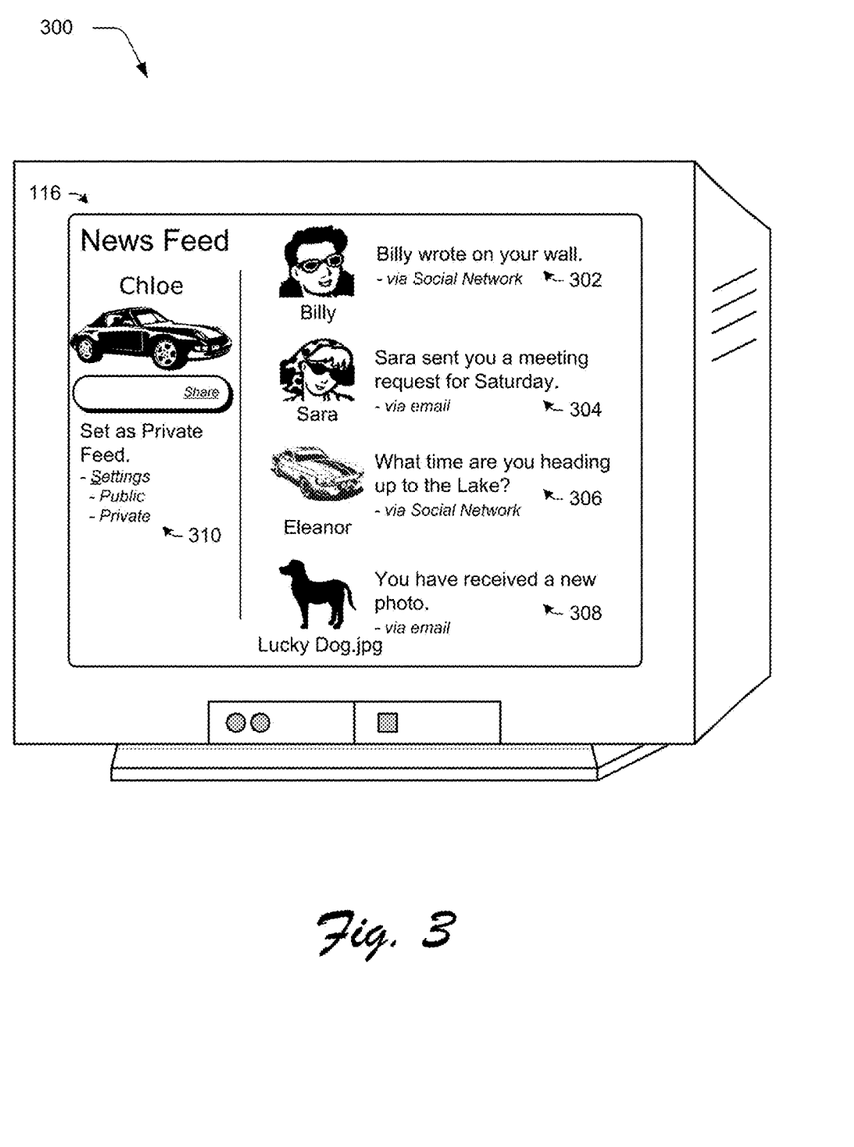
FIG. 3 is an illustration showing an example implementation in which a user interface is output by a client device of FIG. 1 to include content parsed from one or more emails.

FIG. 3 is an illustration showing an example user interface 300 that includes a news feed 116 of FIG. 1 that is configured to include social network content 204 and content 208 taken from the email 120 of FIG. 2. The news feed 116 is illustrated as including status updates 302-308 that describe the content.

For example, a first status update 302 describes a communication provided via a social network service, e.g., "Billy wrote on your wall." The second status update 304 describes a meeting request that was sent via email, e.g., "Sara sent you a meeting request for Saturday." Likewise, a third status update 306 describes a message sent via a social network service, e.g., "What time are you heading up to the Lake?" and the fourth status update describes content received via email, e.g., "You have received a new photo." The status updates may also include corresponding profile information (e.g., image and name) and/or may describe the corresponding content (e.g., the thumbnail image of the photo for the fourth status update).

The status updates 302-308 may also be displayed to indicate an origin of the corresponding content. For example, the first and third status updates 302, 306 indicate that the corresponding content was obtained via a social network service via the text "-via Social Network," whereas the second and fourth status updates 304, 308 indicate that the corresponding content was obtained from email 120.

The user interface 300 is also configured to include functionality regarding settings of the news feed 116. For example, the news feed 116 may include functionality regarding whether content is to be included in a public or private feed. Thus, in this way the user may set whether the content may be viewed publically (e.g., by friends of the user) or is to be viewed privately. A variety of other examples are also contemplated, further discussion of which may be found in relation to the following procedures.

Example Procedures

The following discussion describes news feed techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, and the user interface 300 of FIG. 3.

Figure 4:
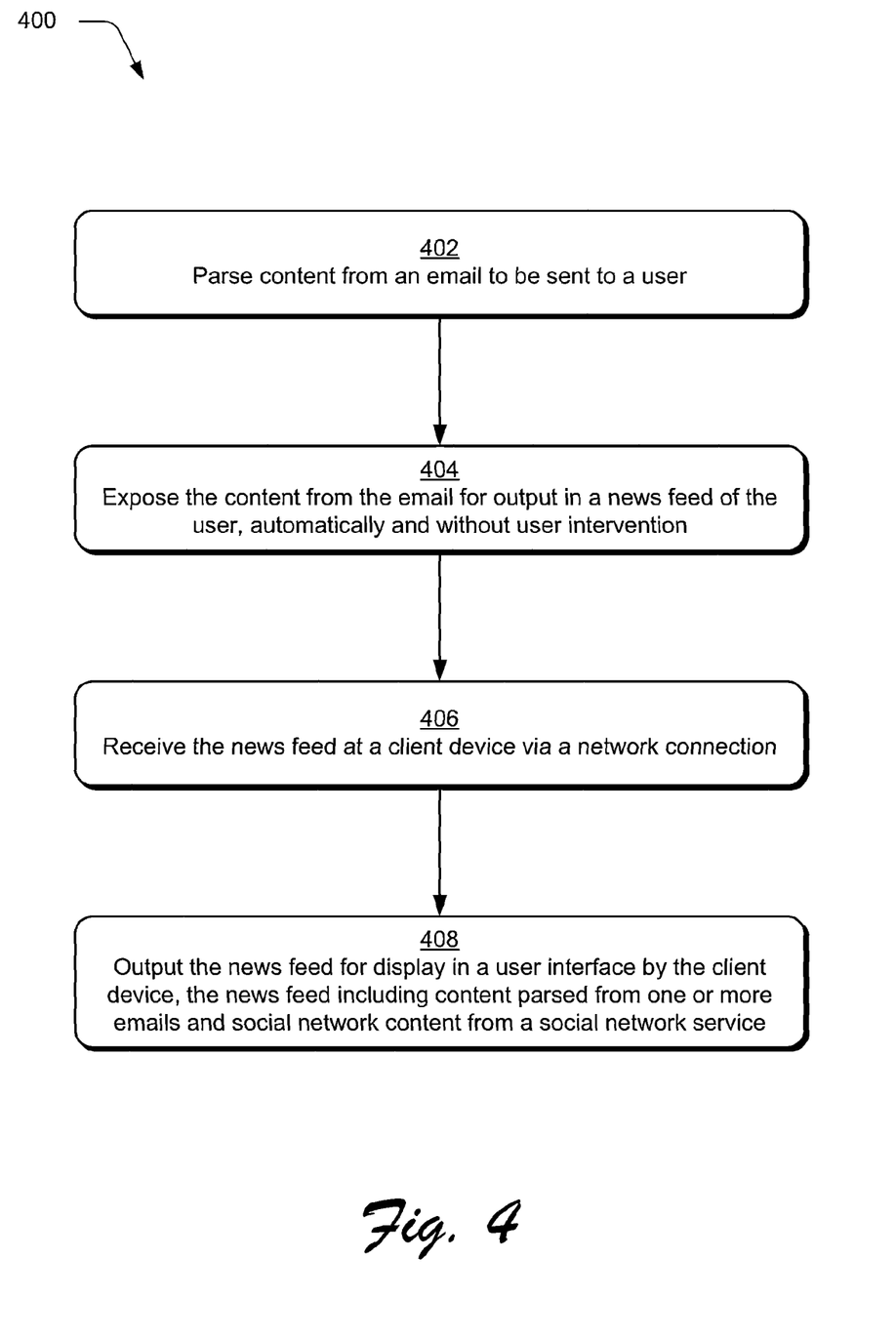
FIG. 4 is a flow diagram that depicts a procedure in an example implementation in which content is parsed from an email and output for display in a news feed at a client device.

FIG. 4 depicts a procedure 400 in an example implementation in which content is parsed from an email for inclusion in a news feed. Content is parsed from an email to be sent to a user (block 402). As previously described, the content may be parsed in a variety of ways. For example, the news feed module 114 may utilize metadata 210 to identify the content 208, e.g., through tags, by following a schema, and so on. In another example, the news feed module 114 may employ logic to identify text and other content 208 that may be relevant, such as by identifying keywords, dates, types of content (e.g., videos, links), and so forth. A variety of other examples are also contemplated. Additionally, this parsing may be performed by a variety of different entities, such as by a social network service 102, the email service 106, a stand-alone service, the client device 104 itself, and so on.

In one such example, this information is transformed or augmented with other pre-configured information based on the source of the email. For example, if an email is sent with a link such as http://www.youtube.com/watch?v=83YZa83wvZc, it may be converted as follows:

```
<object width="480" height="385"><param name="movie"
value="http://www.youtube.com/v/83YZa83wvZc&hl=en_US&fs=1&"></
param><param
name="allowFullScreen"
value="true"></param><param
name="allowscriptaccess"
value="always"></param><embed
src="http://www.youtube.com/v/83YZa83wvZc&hl=en_US&fs=1&"
type="application/x-shockwave-flash" allowscriptaccess="always"
 allowfullscreen="true" width="480"
height="385"></embed></object>
```

Therefore, this may be sent to the news feed instead of a plain URL to use as a playable video in the feed.

The content from the email is exposed for output in a news feed of the user, automatically and without user intervention (block 404). Continuing with the previous example, the parsing and the exposing may be performed automatically by the news feed module 114 without user interaction. The news feed may be exposed in a variety of ways, such as for viewing using browser functionality, streamed over the network 108, and so on.

The news feed is then received at a client device via a network connection (block 406). The news feed 116, for instance, may be received using one or more of the techniques described previously.

The news feed is output for display in a user interface by the client device, the news feed including content parsed from one or more emails and social network content from a social network service (block 408). As shown in the user interface 300 of FIG. 3, for instance, the content 208 parsed from the email 120 may be displayed as status updates in the news feed 116 concurrently with social network content 204. A variety of different social network content may also be displayed in the news feed, such as status updates including posts from micro-blogs, geo-location information from a social network service, and so on. Thus, in this example the user is provided with a user interface through which information that describes social activities from a variety of different sources may be aggregated into a single view. Further, this view may be private or public, further discussion of which may be found in relation to the following figure.

Figure 5:
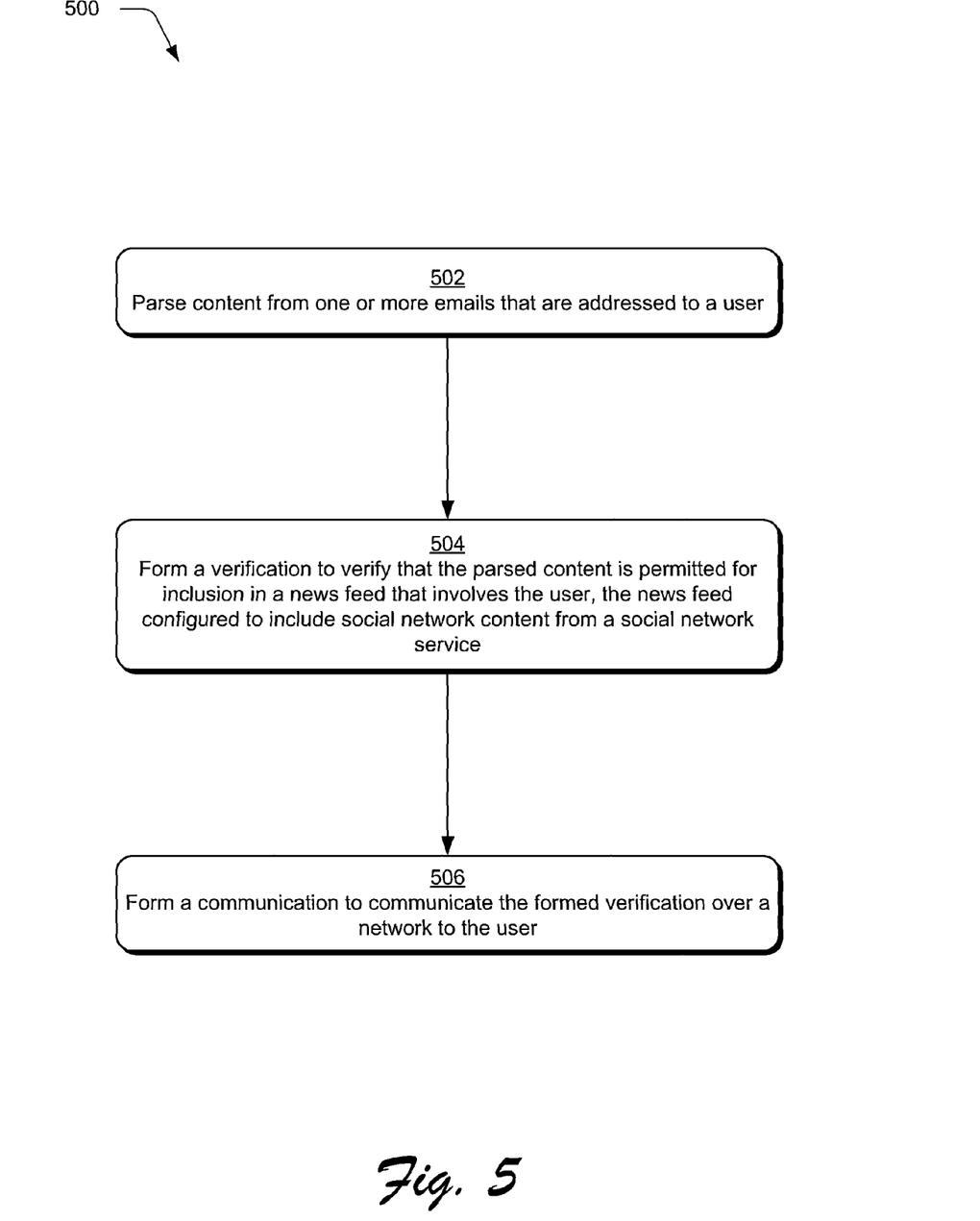
FIG. 5 is a flow diagram that depicts a procedure in an example implementation in which a verification technique is described to verify content for inclusion in a news feed.

FIG. 5 depicts a procedure 500 in an example implementation in which a verification technique is employed to verify that parsed content is to be included in a news feed. Content is parsed from one or more emails that are addressed to a user (block 502). As previously stated, a variety of different techniques may be utilized to parse the email to identify content that is likely to be of interest to a user.

A verification is formed to verify that the parsed content is permitted for inclusion in a news feed that involves the user, the news feed configured to include social network content from a social network service (block 504). For example, the verification may include an indication of the content that is to be included in the news feed, where the content originated (e.g., identification of a sender of the email), portions that are selectable to approve or deny permission to include the content in the news feed, and whether the user has chosen to allow email content to show up in their news feed. Thus, in this example the verification may be used to give a user a measure of control of what content is included in a news feed. For instance, the verification may be used to preview content and approve the content for inclusion in a public feed of the user.

A communication is formed to communicate the formed verification over a network to the user (block 506). For example, the verification may be output as a part of a web user interface, as an email, and so on. Thus, in this example the news feed module 114 may leverage content included in emails to describe social activities that are likely of interest to a user and verify whether this content is suitable for inclusion in a news feed 116. A variety of other examples are also contemplated.

CONCLUSION

Although various embodiments have been described in language specific to structural features and/or methodological acts, it is to be understood that the subject of the appended claims is not necessarily limited to the specific features or acts described. Rather, the specific features and acts are disclosed as example forms of implementing various embodiments.

What is claimed is:

1. A system to control inclusion of content from emails in a news feed, the system comprising:
    a web service embodied on one or more computing devices comprising at least one processor and memory encoding computer executable instructions that, when executed by the at least one processor, cause the at least one processor to:
        parse content from one or more emails received via an email service, the parsed content of a respective email of the one or more emails comprising metadata including one or more tags that indicate whether the content of the respective email originated from a social network service; and
        control exposure of the parsed content from the one or more emails to cause inclusion of the parsed content in the news feed associated with a recipient.

2. A system as recited in claim 1, wherein the web service is further configured to parse in accordance with a metadata schema to read metadata that describes the content of a respective email.

3. A system as recited in claim 2, wherein the metadata is included with the respective email.

4. A system as recited in claim 2, wherein the metadata is generated by an originator of the respective email.

5. A system as recited in claim 1, wherein the news feed also includes social network content.

6. A system as recited in claim 5, wherein the social network content includes one or more status updates.

7. A system as recited in claim 5, wherein the social network content originates from one or more other users of the social network that are specified as friends of the user and the news feed is accessible by the one or more other users.

8. A system as recited in claim 1, wherein the content from at least one of the one or more emails includes non-textual content that is represented in the news feed.

9. A system as recited in claim 1, further comprising outputting a verification to verity that the parsed content is to be included in the news feed.

10. A system as recited in claim 1, wherein the news feed is private to the user.

11. A system to control inclusion of content from emails in a news feed, the system comprising:
 a client device comprising at least one processor and memory encoding computer executable instructions that, when executed by the at least one processor, cause the at least one processor to control output of the news feed received via a network connection in a user interface associated with the client device, the news feed comprising:
  content parsed from an email describing non-textual content of the email, and at least one icon, the icon representing the non-textual content of the email, where the content parsed from the email comprises metadata including one or more tags that indicate whether the content of the respective email originated from a social network service; and
  at least one status update comprised of textual content, where the textual content describes the non-textual content parsed from the email.

12. A system as recited in claim 11, wherein the user interface is provided by a social network service.

13. A system as recited in claim 11, wherein the news feed also includes social network content.

14. A system as recited in claim 13, wherein the social network content includes one or more status updates communicated via the social network service.

15. A system as recited in claim 13, wherein the non-textual content is an image attached to the email.

16. A system as recited in claim 13, wherein the non-textual content is a music file or video file attached to the email.

17. A system as recited in claim 13, wherein the icon representing the non-textual content of the email is configured to display concurrently with one or more icons representing one or more social network contacts of a user of the client device.

18. One or more computing devices comprising at least one processor and memory encoding computer executable instructions that, when executed by the at least one processor, perform a method for controlling inclusion of content from emails in a news feed, the method comprising:
 parsing content from one or more emails addressed to a recipient received via an email service, at least one of the emails comprising non-textual content, the parsed content comprising metadata including one or more tags that indicate whether the content of the respective email originated from a social network service; and
 creating an update for inclusion in the news feed associated with the recipient, the update comprising:
  a textual portion created, at least in part, by utilizing inferred parsing to describe the non-textual content; and
  a non-textual portion configured to include a thumbnail icon that represents the non-textual content; and
 exposing the update to cause output of the update in the news feed associated with the recipient.

19. The one or more computing devices of claim 18, the method further comprising forming a verification that is configured to verify that the update is permitted for inclusion in a news feed that involves the recipient.

20. The one or more computing devices of claim 18, wherein the non-textual content is an image, video file, or music file.

* * * * *